US008621476B2

(12) United States Patent
Youn et al.

(10) Patent No.: US 8,621,476 B2
(45) Date of Patent: Dec. 31, 2013

(54) METHOD AND APPARATUS FOR RESOURCE MANAGEMENT IN GRID COMPUTING SYSTEMS

(75) Inventors: Chan-Hyun Youn, Daejeon (KR); Youngjoo Han, Ulsan (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 857 days.

(21) Appl. No.: 12/635,737

(22) Filed: Dec. 11, 2009

(65) Prior Publication Data

US 2010/0153960 A1    Jun. 17, 2010

(30) Foreign Application Priority Data

Dec. 15, 2008  (KR) .................... 10-2008-0126930
Mar. 26, 2009  (KR) .................... 10-2009-0025913

(51) Int. Cl.
    *G06F 9/46*        (2006.01)
(52) U.S. Cl.
    USPC ......................................................... 718/104
(58) Field of Classification Search
    USPC ......................................................... 718/104
    See application file for complete search history.

(56) References Cited

U.S. PATENT DOCUMENTS

| 5,790,862 | A  | * | 8/1998 | Tanaka et al. ............... 717/159 |
| 7,647,523 | B2 |   | 1/2010 | Lindquist et al. |
| 2005/0114860 | A1 | * | 5/2005 | Lin et al. ..................... 718/100 |
| 2006/0149576 | A1 | * | 7/2006 | Ernest et al. ..................... 705/1 |
| 2008/0115143 | A1 | * | 5/2008 | Shimizu et al. ............... 718/105 |
| 2009/0119673 | A1 | * | 5/2009 | Bubba ........................... 718/104 |

FOREIGN PATENT DOCUMENTS

| JP | 2005-309868 | 11/2005 |
| KR | 10-2005-0095568 | 9/2005 |
| KR | 10-2007-0041462 | 4/2007 |
| KR | 10-0734818 | 7/2007 |

* cited by examiner

*Primary Examiner* — Mengyao Zhe
(74) *Attorney, Agent, or Firm* — Bacon & Thomas, PLLC

(57) ABSTRACT

A method for resource management in grid computing systems includes defining user's demands on execution of a task as SLA (Service Level Agreements) information; monitoring states of resources in a grid to store the states as resource state information; calculating for each resource in the grid, based on the resource state information, an expected completion time of the task and an expected profit to be obtained by completing the task; creating an available resource cluster by using the expected execution time and the expected profit; and determining, if the SLA information is satisfied by the available resource cluster, a task processing policy for executing the task by using at least one resource in the available resource cluster. The available resource cluster is a set of resources having the expected completion time within a deadline of the task and the expected profit being positive.

13 Claims, 5 Drawing Sheets

METHOD AND APPARATUS FOR RESOURCE MANAGEMENT IN GRID COMPUTING SYSTEMS

FIELD OF THE INVENTION

The present invention relates to grid computing systems; and, more particularly, to a method and apparatus for resource management in grid computing systems, which allow resource-aware policy administration based on service level agreements, real-time resource states and characteristics of a task, i.e., application program.

BACKGROUND OF THE INVENTION

Grid computing is regarded as a next-generation digital neural network service, which interconnects geographically-distributed resources of high-performance computers, mass storage devices and high-technology equipments via high-performance networks to make the resources shared therebetween.

That is, the grid computing creates a virtual system in which resources, e.g., computing power, storage devices, application programs, data and I/O devices, are shared between distributed computer systems via the Internet.

Such grid computing is being settled as a new computing paradigm to solve mass applications for, e.g., engineering, natural science and economics, and also being developed into cloud computing for the mass of people.

In the grid computing, complexity in resource management to efficiently manage various resources in a grid while satisfying users' demands increases exponentially as the number of resources in the grid increases.

A key element of the grid computing to achieve optimal resource management with a resource cluster having a large number of target resources is grid computing middleware. The grid computing middleware includes various functional blocks, e.g., service access blocks, control blocks, resource selection blocks and resource allocation blocks.

For the conventional grid computing middleware which serves to monitor, control and distribute requests for resources in a widely-dispersed computer network environment, "integrated load distribution and resource management" and "grid resource management" have been suggested.

The "integrated load distribution and resource management" matches expected requests on web objects with available capacity of web servers to thereby dynamically configure both of requests on web objects and capacity of web servers.

The "grid resource management" defines user-desired performance and required service levels as service level agreements (hereinafter, referred to as "SLA") and provides resource allocation and task management technique based on the SLA and characteristics of application program.

For resource management in grid computing systems, it is required to monitor resource states which vary in time and space, to satisfy users' demands within users' budgets and to provide reliable execution of tasks.

However, since the "integrated load distribution and resource management" is designed to be optimized in geographically-limited environments, it is less efficient to use the "integrated load distribution and resource management" in terms of resource sharing on the Internet. Particularly, in cases where hundreds or thousands of resources are available, conventional linear programming based optimal resource management systems cannot flexibly cope with elapse of time and changes in environment.

Further, since the "grid resource management" requires accurate specification of respective performance parameters, e.g., CPUs, memories and hard disks, in order to define the user-desired performance and the required service level, it is difficult to implement the "grid resource management" and to flexibly cope with various requirements, e.g., a deadline of a task submitted by a user. Also, it is difficult to provide commercial services using the "grid resource management" because the "grid resource management" does not take into consideration service costs to be paid by users and profits of service providers.

SUMMARY OF THE INVENTION

In view of the above, the present invention provides a method and apparatus for resource management in grid computing systems, in which deadlines of tasks and users' available budgets for grid services are defined as service level agreements to optimize quality of service.

In accordance with an aspect of the present invention, there is provided a method for resource management in grid computing systems, including:

defining user's demands on execution of a task as SLA (Service Level Agreements) information;

monitoring states of resources in a grid to store the states as resource state information;

calculating for each resource in the grid, based on the resource state information, an expected completion time of the task and an expected profit to be obtained by completing the task;

creating an available resource cluster by using the expected execution time and the expected profit; and determining, if the SLA information is satisfied by the available resource cluster, a task processing policy for executing the task by using at least one resource in the available resource cluster, wherein the SLA information includes a deadline of the task, a user's available budget for the task and a type of the task; and wherein the available resource cluster is a set of resources having the expected completion time within the deadline and the expected profit being positive.

Preferably, the task processing policy is determined based on the expected completion time, the expected profit and the available resource cluster.

The method may further include determining, if the SLA information is not satisfied by the available resource cluster, whether the task is divisible; dividing, if the task is divisible, the task into partial tasks based on the resource state information; and determining, if the SLA information is satisfied via the task division, the task processing policy for executing the task on a partial task basis by using one or more resources in the available resource cluster.

The method may further include adjusting, if the task is not divisible, the SLA information via negotiation with the user.

The method may further include adjusting, if the task is not satisfied via the task division, the SLA information via negotiation with the user.

Preferably, said dividing the task includes determining, while increasing a number of resources in a resource cluster to which the partial tasks are to be allocated, the resource cluster and sizes of the partial tasks based on expected completion times of the partial tasks and expected profits to be obtained by completing the partial tasks.

The method may further include allocating the task to said at least one resource according to the task processing policy; executing the task by using said at least one resource; monitoring the task being executed to determine whether the SLA is satisfied; and notifying, if the task is completed, completion and execution results of the task to the user.

Preferably, said monitoring the task being executed includes allocating, if the SLA is not satisfied, the task to at least one substitute resource in the available resource cluster; and executing the task by using said at least one substitute resource.

In accordance with another aspect of the present invention, there is provided an apparatus for resource management in grid computing systems, including:

a service level management unit for defining user's demands on execution of a task as SLA (Service Level Agreements) information and storing the SLA information;

a resource state management unit for monitoring states of resources in a grid and storing the states as resource state information; and a resource-aware policy management unit including:
a task processing policy decision unit for determining, based on the SLA information and the resource state information, a task processing policy for executing the task; and
a task management unit for executing the task according to the task processing policy, wherein the SLA information includes a deadline of the task, a user's available budget for the task and a type of the task.

Preferably, the task processing policy decision unit includes an expected completion time calculation unit for calculating for each resource in the grid, based on the resource state information, an expected completion time of the task; an expected profit calculation unit for calculating for each resource in the grid, based on the resource state information, an expected profit to be obtained by completing the task; an available resource cluster creation unit for creating an available resource cluster by using the expected execution time and the expected profit; and a task processing policy creation unit for determining, if the SLA information is satisfied by the available resource cluster, a task processing policy for executing the task by using at least one resource in the available resource cluster, wherein the available resource cluster is a set of resources having the expected completion time within the deadline and the expected profit being positive.

Preferably, the task processing policy creation unit determines the task processing policy based on the expected completion time, the expected profit and the available resource cluster.

Preferably, the task processing policy decision unit further includes a task division unit for dividing, if and the task is divisible, the task into partial tasks based on the resource state information.

Preferably, if the SLA information is not satisfied by the available resource cluster but satisfied via the task division by the task division unit, the task processing policy creation unit determines the task processing policy for executing the task on a partial task basis by using one or more resources in the available resource cluster.

Preferably, the task processing policy decision unit further includes a task processing policy adjustment unit for adjusting the SLA information via negotiation with the user, if the SLA is satisfied neither by the available resource cluster nor by the task division by the tack unit.

Preferably, the task division unit determines, while increasing a number of resources in a resource cluster to which the partial tasks are to be allocated, the resource cluster and sizes of the partial tasks based on expected completion times of the partial tasks and expected profits to be obtained by completing the partial tasks.

Preferably, the task management unit further includes a task processing policy execution unit for allocating the task to at least one resource in the available resource cluster; a task execution unit for executing the task by using said at least one resource according to the task processing policy; and a task monitoring unit for monitoring the task being executed to determine whether the SLA is satisfied.

Preferably, if the task monitoring unit that the SLA is not satisfied, the task processing policy execution unit allocates the task to at least one substitute resource in the available resource cluster and the task execution unit executes the task by using said at least one substitute resource.

Preferably, the expected profit calculation unit calculates the expected profit for each resource by subtracting a total cost for use in executing the task from a user's budget to be paid for completion of the task.

Preferably, the total cost is calculated by summing an expected cost and a penalty for missing the deadline of the task, the expected cost calculated by using the expected completion time and a billing policy.

According to the present invention, real-time resource states varying in time and space are monitored to calculate for each resource an expected completion time of a task and an expected profit to be obtained by completing the task, thereby finding the available resource cluster satisfying deadline of the task while providing a profit to the service provider. The optimum task processing policy to execute the task while satisfying the SLA information is determined to use resources in the available resource cluster. Particularly, if the SLA information is not satisfied by the available resource cluster, the task is divided into partial tasks and the task processing policy is determined to execute the task on a partial task basis. Further, the SLA information can be adjusted via negotiation with a user. Furthermore, the task being executed is monitored to provide a reliable task execution environment to the user in the complicated resource-dispersed environment.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings, which form a part hereof.

Figure 1:
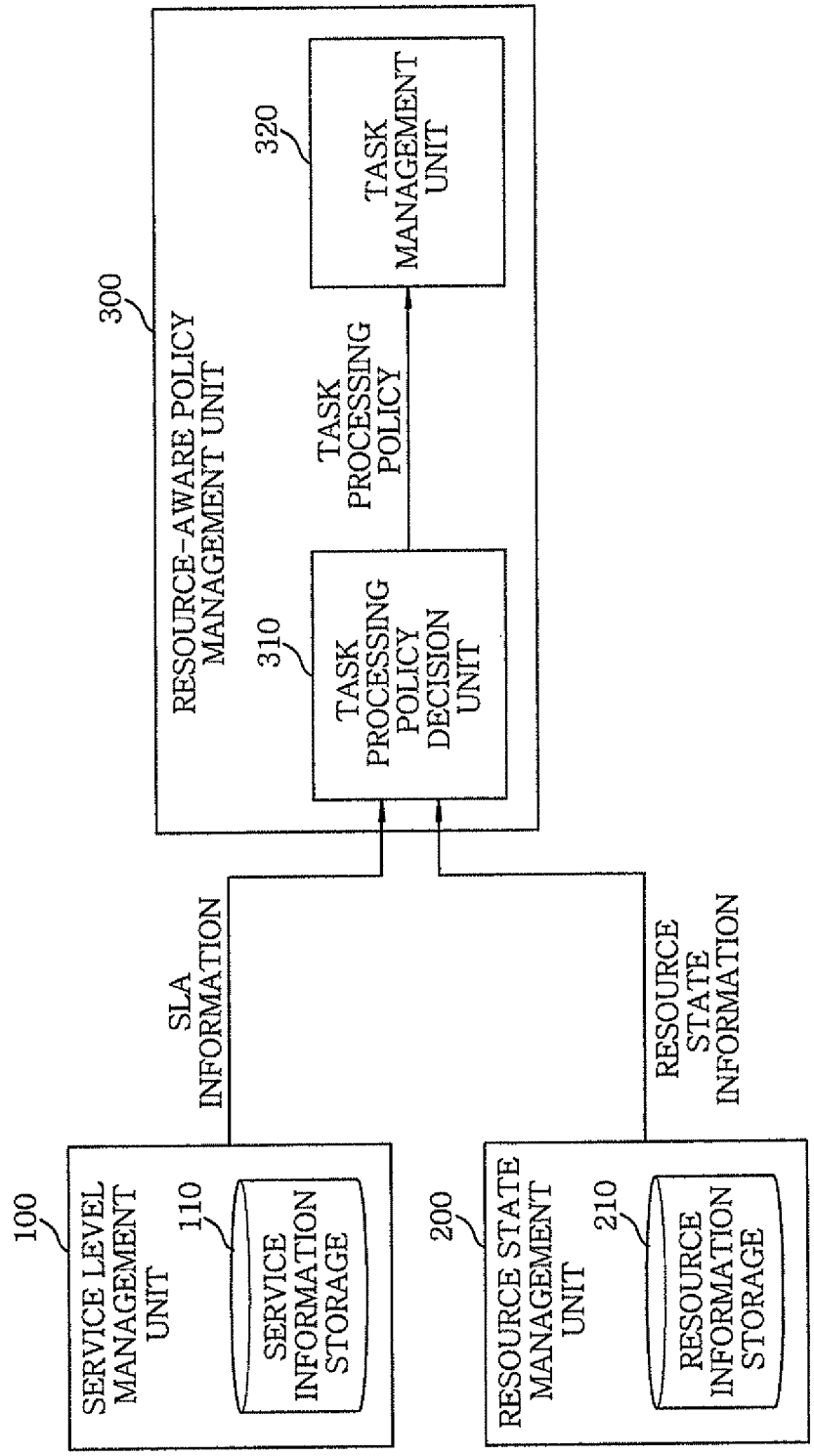
FIG. 1 illustrates a block diagram of an apparatus for resource management in grid computing systems in accordance with an embodiment of the present invention.

FIG. 1 illustrates a block diagram of an apparatus for resource management in grid computing systems in accordance with an embodiment of the present invention. The apparatus includes a service level management unit 100, a resource state management unit 200 and a resource-aware policy management unit 300.

The service level management unit 100 defines user's demands on execution of a task as SLA (Service Level Agreements) information and stores the SLA information in a service information storage 110. Here, the SLA information may include, e.g., a deadline of a task, a user's available budget for the task and a type of the task (characteristics and details of the task).

The resource state management unit 200 monitors states of resources in a grid and stores the states as resource state information in a resource information storage 210.

The SLA information and the resource state information stored in the service information storage 110 and the resource information storage 210, respectively, are provided to the resource-aware policy management unit 300.

The resource-aware policy management unit 300 includes a task processing policy decision unit 310 and a task management unit 320. The resource-aware policy management unit 300 calculates for each resource, based on the SLA information and the resource state information, in the grid an expected completion time of the task and an expected profit to be obtained by completing the task, creates an available resource cluster based on the execution time and the expected profit, and decides a task processing policy to execute the task. The expected completion time, the expected profit and the available resource cluster will be described in detail later. Further, when necessary, the resource-aware policy management unit 300 may divide the task into partial tasks.

Below, details of the resource-aware policy management unit 300 will be described with reference to FIG. 2.

Figure 2:
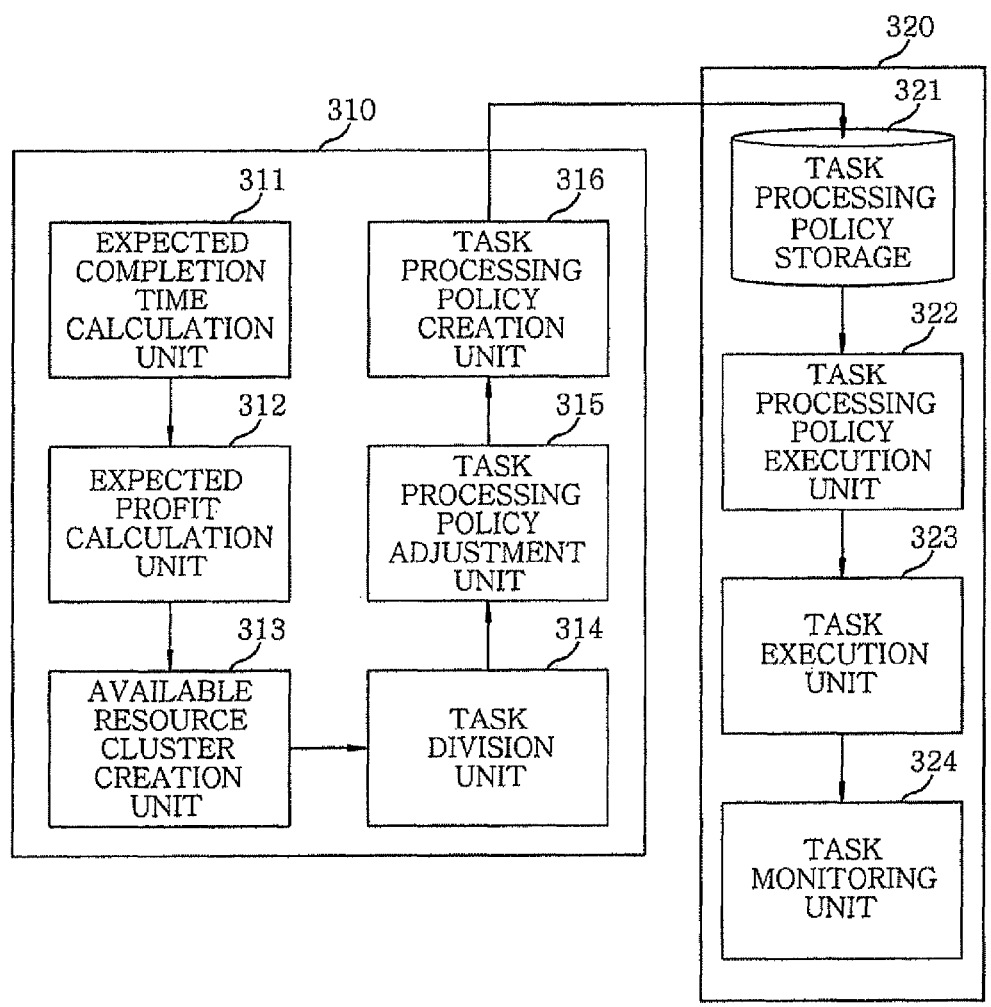
FIG. 2 illustrates a block diagram of the resource-aware policy management unit of FIG. 1.

Referring to FIG. 2, the task processing policy decision unit 310 includes an expected completion time calculation unit 311, an expected profit calculation unit 312, an available resource cluster creation unit 313, a task division unit 314, a task processing policy adjustment unit 315 and a task processing policy creation unit 316.

The task management unit 320 includes a task processing policy storage 321, a task processing policy execution unit 322, a task execution unit 323 and a task monitoring unit 324.

The SLA information and the resource state information obtained by the service level management unit 100 and the resource state management unit 200, respectively, are provided to the expected completion time calculation unit 311.

The expected completion time calculation unit 311 recognizes a size of the task and real-time states of resources in the grid by using the SLA information and the resource state information, and calculates for each resource the expected completion time of the task based on a computing speed thereof.

The expected profit calculation unit 312 calculates the expected profit for each resource by calculating a total cost for use in executing the task and subtracting the total cost from a user's budget to be paid for completing the task. The total cost is sum of a penalty for missing the deadline of the task and an expected cost calculated by using the expected completion time and a billing policy.

The available resource cluster creation unit 313 creates the available resource cluster by excluding, based on the expected completion time and the expected profit, resources which do not satisfy the user's requirements from the entire resources in the grid. That is, the available resource cluster is a set of resources which have expected completion times within the deadline of the task and provides a positive profit to a grid computing provider.

The task division unit 314 divides the task into multiple partial tasks, if the available resource cluster cannot be created by the available resource cluster creation unit 313 because there is no resource having an expected completion time for the task within the deadline thereof while providing a positive profit, i.e., if the SLA information cannot be satisfied by the available resource cluster.

The task processing policy adjustment unit 315 adjusts, when the SLA information cannot be satisfied by the available resource cluster, the SLA information via a negotiation process on service quality with the user. After the negotiation, creation of the available resource cluster may be performed again according to the adjusted SLA information.

The task processing policy creation unit 316 creates a policy for processing the task, based on the expected completion time, the expected profit and the available resource cluster, and when necessary, further based on the task division result by the task division unit 314 and the negotiation result by the task processing policy adjustment unit 315.

The task processing policy created by the task processing policy creation unit 316 is provided to the task management unit 320.

The task management unit 320 includes the task processing policy storage 321, the task processing policy execution unit 322, the task execution unit 323 and the task monitoring unit 324.

The task processing policy storage 321 stores therein the task processing policy received from the task processing policy creation unit 316.

The task processing policy execution unit 322 manages the task processing policy of each task to be executed and provides the policy to the task execution unit 323 executing the task.

The task execution unit 323 executes the task according to the task processing policy managed by the task processing policy execution unit 322.

The task monitoring unit 324 monitors the task being executed, and notifies the task processing policy execution unit 322 an execution failure so that the task processing policy execution unit 322 can reallocate substitute resources to the task.

Hereinafter, a method for resource management in grid computing systems in accordance with an embodiment of the present invention will be described in detail with reference to FIGS. 3 to 6.

Figure 3:
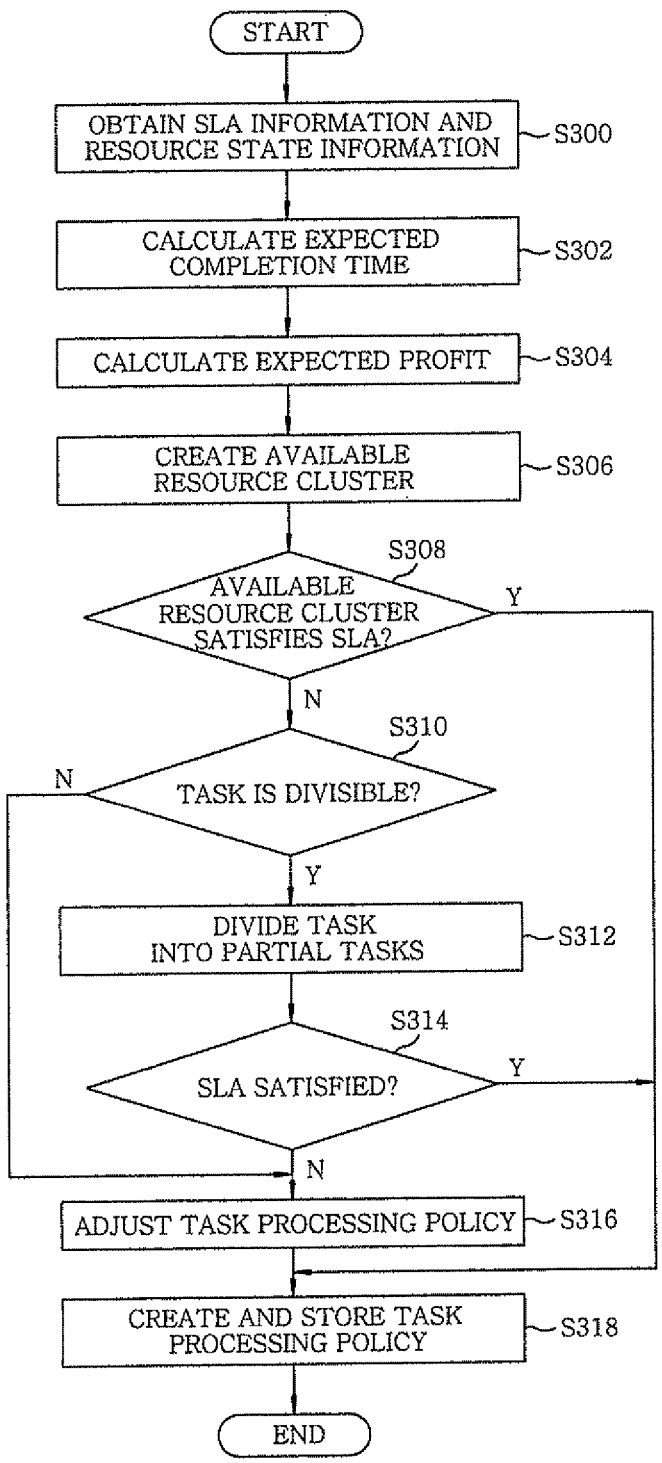
FIG. 3 illustrates a flowchart of a method for resource management in grid computing systems in accordance with an embodiment of the present invention, particularly, a task processing policy decision procedure.

FIG. 3 illustrates a flowchart of a method for resource management in grid computing systems in accordance with an embodiment of the present invention, particularly, a task processing policy decision procedure performed by the task processing policy decision unit 310.

As shown in FIG. 3, the task processing policy decision unit 310 obtains the SLA information and the resource state information from the service information storage 110 of the service level management unit 100 and the resource information storage 210 of the resource state management unit 200, respectively (step S300).

The expected completion time calculation unit 311 in the task processing policy decision unit 310 calculates the expected completion time of the task for each resource based on the resource state information (step S302).

The expected profit calculation unit 312 calculates the expected profit for each resource based on user's budget contained in the SLA information and the total cost as described above (step S304).

The available resource cluster creation unit 313 creates the available resource cluster by using the expected completion time and the expected profit (step S306). As described above, the available resource cluster is a set of resources, which have the expected completion times within the deadline of the task and provide positive profits.

The task processing policy decision unit 310 determines whether the available resource cluster created by the available resource cluster creation unit 313 satisfies the SLA information (step S308). If it is determined in the step S308 that the available resource cluster satisfies the SLA information, the task processing policy creation unit 316 creates an optimum task processing policy for processing the task based on the expected completion time, the expected profit and the available resource cluster information, and stores the optimum task processing policy in the task processing policy storage 321 of the task management unit 320 (step S318).

Meanwhile, if it is determined in the step S308 that the available resource cluster does not satisfy the SLA information, the task processing policy decision unit 310 determines whether the task is divisible (step S310). If it is determined in the step S310 that the task is divisible, the task division unit 314 divides the task into partial tasks (step S312). Such task division may be performed based on the resource state information.

Thereafter, it is determined whether the SLA information becomes to be satisfied via the task division (step S314). If it is determined in the step S314 that the SLA information becomes to be satisfied, the task processing policy creation unit 316 creates an optimum task processing policy for processing the task on a partial task basis based on the selected resources, the sizes of the partial tasks, the expected completion times of the partial tasks and the expected profits due to the partial tasks, and stores the optimum task processing policy in the task processing policy storage 321 of the task management unit 320 (step S318).

If it is determined in the step S314 that the SLA does not become to be satisfied, the task processing policy adjustment unit 315 performs a service level negotiation with the user and adjusts the task processing policy (step S316).

Figure 4:
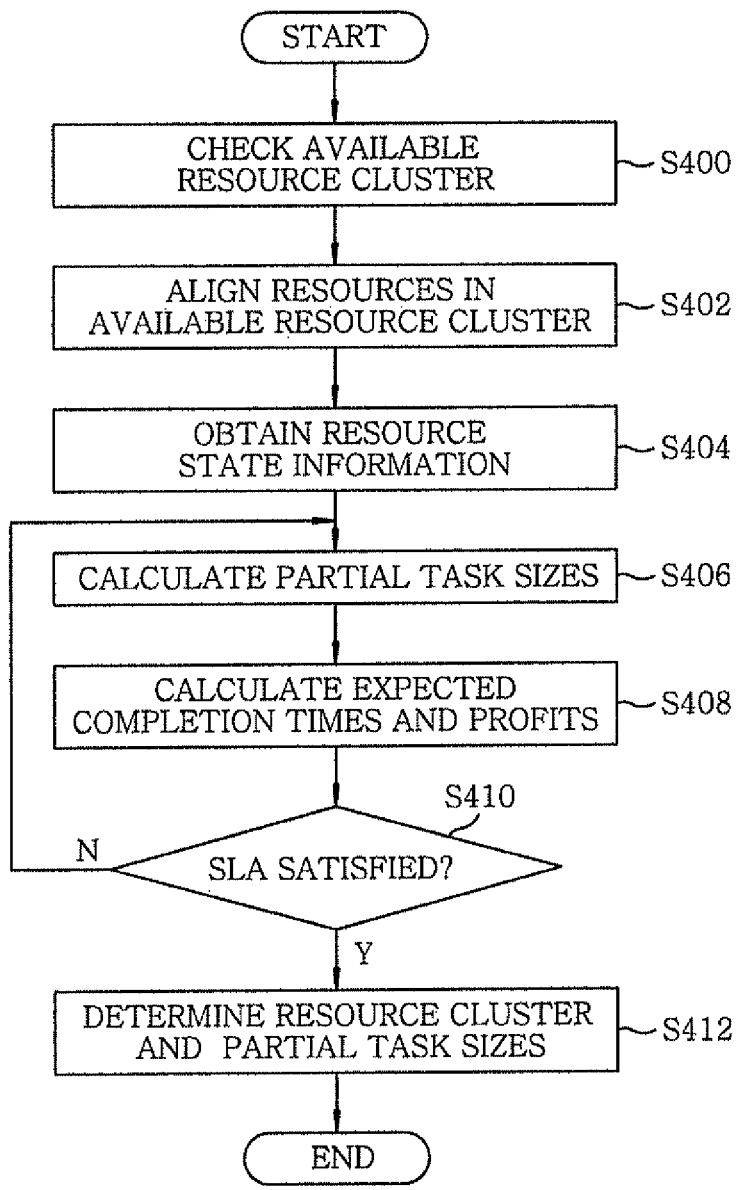
FIG. 4 illustrates a flowchart of the task division procedure of FIG. 3.

FIG. 4 illustrates a flowchart of the task division procedure (step S312) performed by the task division unit 314 of FIG. 3.

The task division unit 314 may determine the optimum sizes of partial tasks to be allocated to resources based on system performance of each resource to satisfy the deadline of the task specified in the SLA.

The task division unit 314 checks the available resource cluster to which the partial tasks are to be allocated (step S400), and aligns the resources in the available resource cluster in a descending order on the basis of differences between the deadline of the task and the expected completion time (step S402).

The task division unit 314 obtains state information of the available resources (step S404), and calculates sizes of the partial tasks to be allocated to the resources based on the state information thereof obtained in the step S404 while incrementing the number of resources to be used in the task division (step S406).

Thereafter, expected completion times and expected profits are calculated under a condition that the partial tasks having the sizes calculated in the step S406 are executed in the resources (step S408).

Further, the task division unit 314 determines whether the entire task satisfies the SLA information based on the expected execution times and the expected profits calculated in the step S408 (step S410). If it is determined in the step S410 that the entire task satisfies the SLA information, the task division unit 314 determines a resource cluster for use in the task division and the sizes of the partial tasks to be allocated to the resources in the resource cluster (step S412).

Meanwhile, if the entire task does not satisfy the SLA information, the control returns to the step S406 and repeats the series of processes to calculate the sizes of the partial tasks to be allocated to the resources.

Figure 5:
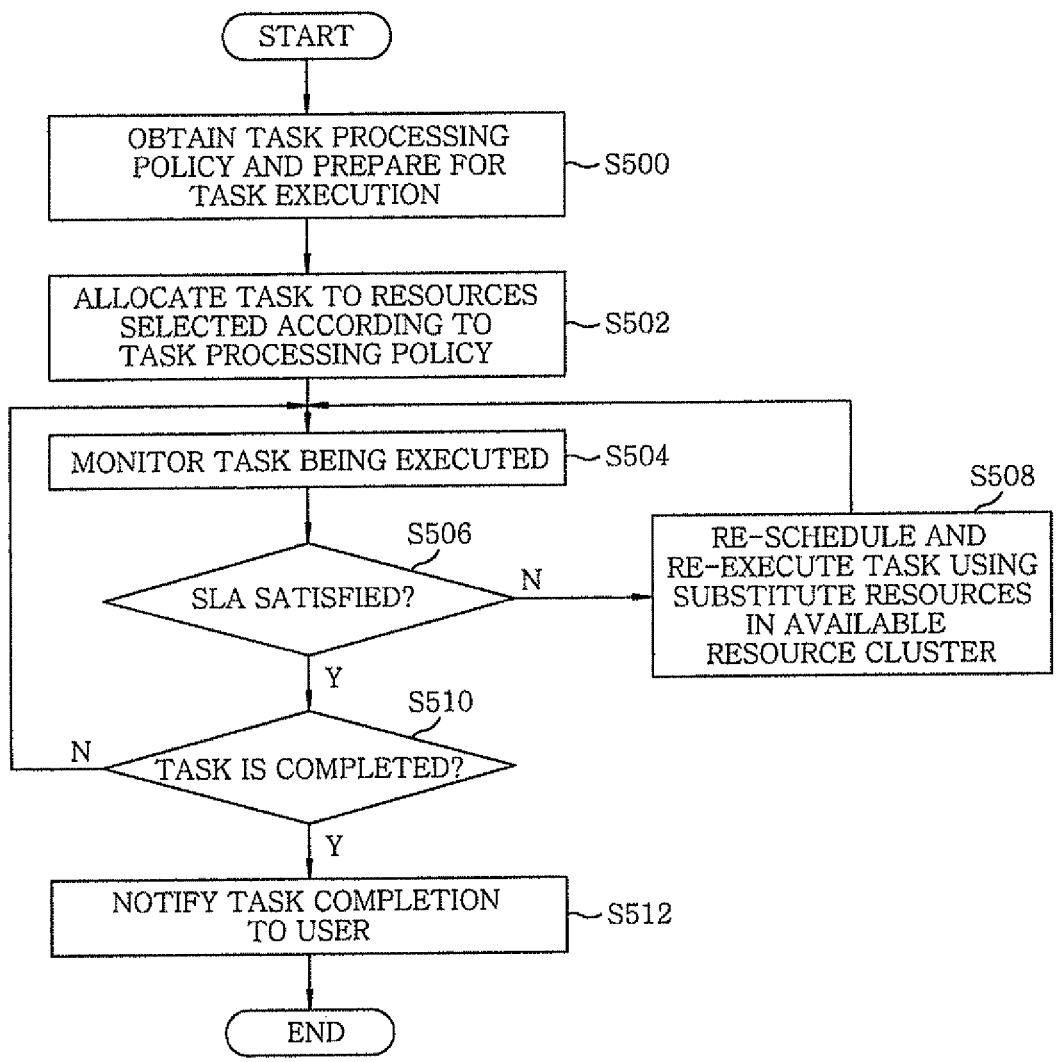
FIG. 5 illustrates a flowchart of a task management procedure performed by the task management unit of FIGS. 1 and 2.

FIG. 5 illustrates a flowchart of a task management procedure performed by the task management unit 320 of FIGS. 1 and 2.

The task processing policy execution unit 322 of the task management unit 320 obtains and recognizes a task processing policy stored in the task processing policy storage 321, and prepares for the execution of the task via the task processing execution unit 323 based on the task processing policy (step S500).

Next, the task execution unit 323 allocates the task to resources selected according to the task processing policy (step S502). Here, when the task is completed and the application program is ended, an execution result and completion of the task are notified to the user (step S512).

Meanwhile, the task monitoring unit 324 monitors an execution state of the task being executed by the task execution unit 323 (step S504). That is, it is determined whether the execution state does not satisfy a required level, i.e., whether failure or breakdown occurs during the execution (step S506). If it is determined in the step S506 that the execution state does not satisfy the required level, the task management unit 320 determines to re-schedule or re-execute the task by using substitute resources in the available resource cluster (step S508).

Meanwhile, if the task state satisfies the required task level, the task management unit 320 determines whether the task is completed (step S510). If it is determined in the step S510 that the task is completed, the task management unit 320 notifies the execution result and completion of the task to the user in the step S512.

While the invention has been shown and described with respect to the embodiments, it will be understood by those skilled in the art that various changes and modification may be made without departing from the scope of the invention as defined in the following claims.

What is claimed is:

1. A method for resource management in grid computing systems, comprising:
defining user's demands on execution of a task as SLA (Service Level Agreements) information;
monitoring states of resources in a grid to store the states as resource state information;
calculating for each resource in the grid, based on the resource state information, an expected completion time of the task and an expected profit to be obtained by completing the task;
creating an available resource cluster by using the expected execution time and the expected profit; and
determining, if the SLA information is satisfied by the available resource cluster, a task processing policy for executing the task by using at least one resource in the available resource cluster,
wherein the SLA information includes a deadline of the task, a user's available budget for the task and a type of the task;
wherein the available resource cluster is a set of resources having the expected completion time within the deadline and the expected profit being positive, and
wherein the method further comprises:

determining, if the SLA information is not satisfied by the available resource cluster, whether the task is divisible;

dividing, if the task is divisible, the task into partial tasks based on the resource state information;

determining, if the SLA information is satisfied via the task division, the task processing policy for executing the task on a partial task basis by using one or more resources in the available resource cluster; and adjusting, if the task is not divisible, the SLA information via negotiation with the user.

2. The method of claim 1, wherein the task processing policy is determined based on the expected completion time, the expected profit and the available resource cluster.

3. The method of claim 1, further comprising:

adjusting, if the task is not satisfied via the task division, the SLA information via negotiation with the user.

4. The method of claim 1, wherein said dividing the task includes:

determining, while increasing a number of resources in a resource cluster to which the partial tasks are to be allocated, the resource cluster and sizes of the partial tasks based on expected completion times of the partial tasks and expected profits to be obtained by completing the partial tasks.

5. The method of claim 1, further comprising:

allocating the task to said at least one resource according to the task processing policy;

executing the task by using said at least one resource;

monitoring the task being executed to determine whether the SLA information is satisfied; and notifying, if the task is completed, completion and execution results of the task to the user.

6. The method of claim 5, wherein said monitoring the task being executed includes:

allocating, if the SLA information is not satisfied, the task to at least one substitute resource in the available resource cluster; and executing the task by using said at least one substitute resource.

7. An apparatus for resource management in grid computing systems, comprising:

a service level management unit having a service information storage for defining user's demands on execution of a task as SLA (Service Level Agreements) information and storing the SLA information in the service information storage;

a resource state management unit having a resource information storage for monitoring states of resources in a grid and storing the states as resource state information in the resource information storage; and a resource-aware policy management unit including:

a task processing policy decision unit for determining, based on the SLA information and the resource state information, a task processing policy for executing the task; and a task management unit for executing the task according to the task processing policy, wherein the SLA information includes a deadline of the task, a user's available budget for the task and a type of the task, wherein the task processing policy decision unit includes:

an expected completion time calculation unit for calculating for each resource in the grid, based on the resource state information, an expected completion time of the task;

an expected profit calculation unit for calculating for each resource in the grid, based on the resource state information, an expected profit to be obtained by completing the task;

an available resource cluster creation unit for creating an available resource cluster by using the expected execution time and the expected profit; and a task processing policy creation unit for determining, if the SLA information is satisfied by the available resource cluster, a task processing policy for executing the task by using at least one resource in the available resource cluster, wherein the available resource cluster is a set of resources having the expected completion time within the deadline and the expected profit being positive, wherein the task processing policy decision unit further includes:

a task division unit for dividing, if the task is divisible, the task into partial tasks based on the resource state information; and a task processing policy adjustment unit for adjusting the SLA information via negotiation with the user, if the SLA information is satisfied neither by the available resource cluster nor by the task division by the tack unit, and wherein if the SLA information is not satisfied by the available resource cluster but satisfied via the task division by the task division unit, the task processing policy creation unit determines the task processing policy for executing the task on a partial task basis by using one or more resources in the available resource cluster.

8. The apparatus of claim 7, wherein the task processing policy creation unit determines the task processing policy based on the expected completion time, the expected profit and the available resource cluster.

9. The apparatus of claim 7, wherein the task division unit determines, while increasing a number of resources in a resource cluster to which the partial tasks are to be allocated, the resource cluster and sizes of the partial tasks based on expected completion times of the partial tasks and expected profits to be obtained by completing the partial tasks.

10. The apparatus of claim 7, wherein the task management unit further includes:

a task processing policy execution unit for allocating the task to at least one resource in the available resource cluster;

a task execution unit for executing the task by using said at least one resource according to the task processing policy; and a task monitoring unit for monitoring the task being executed to determine whether the SLA information is satisfied.

11. The apparatus of claim 10, wherein if the task monitoring unit that the SLA information is not satisfied, the task processing policy execution unit allocates the task to at least one substitute resource in the available resource cluster and the task execution unit executes the task by using said at least one substitute resource.

12. The apparatus of claim 7, wherein the expected profit calculation unit calculates the expected profit for each resource by subtracting a total cost for use in executing the task from a user's budget to be paid for completion of the task.

13. The apparatus of claim 12, wherein the total cost is calculated by summing an expected cost and a penalty for missing the deadline of the task, the expected cost calculated by using the expected completion time and a billing policy.

* * * * *